United States Patent
Murugan et al.

(10) Patent No.: US 11,388,640 B2
(45) Date of Patent: Jul. 12, 2022

(54) ENHANCED CAPABILITY EXCHANGE PROCEDURE FOR RADIO ACCESS TECHNOLOGY CHANGE

(71) Applicant: QUALCOMM Incorporated, San Diego, CA (US)

(72) Inventors: Muralidharan Murugan, Hyderabad (IN); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/703,554

(22) Filed: Sep. 13, 2017

(65) Prior Publication Data

US 2018/0098255 A1     Apr. 5, 2018

Related U.S. Application Data

(60) Provisional application No. 62/402,426, filed on Sep. 30, 2016.

(51) Int. Cl.
*H04W 36/14* (2009.01)
*H04W 36/00* (2009.01)
(Continued)

(52) U.S. Cl.
CPC ........... *H04W 36/14* (2013.01); *H04W 8/24* (2013.01); *H04W 36/0066* (2013.01); *H04W 8/10* (2013.01)

(58) Field of Classification Search
CPC ......... H04W 36/14; H04W 8/10; H04W 8/24; H04W 48/16; H04W 88/06; H04W 36/0066
See application file for complete search history.

(56) References Cited

U.S. PATENT DOCUMENTS 9,591,513 B2   3/2017   Balasubramanian et al.
9,699,690 B2   7/2017   Palm et al.
(Continued)

FOREIGN PATENT DOCUMENTS

CN   101686510 A   3/2010
CN   103249099 A   8/2013
(Continued)

OTHER PUBLICATIONS

International Search Report and Written Opinion—PCT/US2017/051608—ISA/EPO—dated Dec. 1, 2017.

*Primary Examiner* — Shukri Taha
(74) *Attorney, Agent, or Firm* — Patterson + Sheridan, LLP

(57) ABSTRACT

Certain aspects of the present disclosure relate to methods and apparatus for enhanced user equipment (UE) capability exchange for transitioning a connection from a first radio access technology system to a second radio access technology system. An exemplary method performed by a UE includes communicating with a first base station (BS) via a connection of a first radio access technology (RAT), determining, based on the first RAT, to omit a set of capabilities of the UE from capabilities information of the UE regarding a second RAT, transmitting the capabilities information of the UE regarding the second RAT to the first BS via the first RAT, communicating with a second BS via the second RAT according to the capabilities information, and sending an update of the capabilities information of the UE regarding the second RAT via the second RAT.

20 Claims, 6 Drawing Sheets

(51) Int. Cl.
    *H04W 8/24*    (2009.01)
    *H04W 8/10*    (2009.01)

(56) References Cited

U.S. PATENT DOCUMENTS

| | | | |
|---|---|---|---|
| 9,961,591 B2 | 5/2018 | Swaminathan et al. | |
| 2014/0329557 A1* | 11/2014 | Van der Velde | H04W 48/16 |
| | | | 455/552.1 |
| 2015/0257013 A1 | 9/2015 | Patel et al. | |
| 2015/0312787 A1 | 10/2015 | Das et al. | |
| 2016/0057662 A1* | 2/2016 | Persson | H04W 8/24 |
| | | | 455/436 |
| 2016/0127998 A1* | 5/2016 | Roessel | H04W 52/0277 |
| | | | 370/311 |
| 2016/0143035 A1 | 5/2016 | Xue et al. | |
| 2016/0157140 A1* | 6/2016 | Tiwari | H04W 36/0066 |
| | | | 455/436 |
| 2016/0262053 A1* | 9/2016 | Palm | H04L 5/001 |
| 2016/0277968 A1 | 9/2016 | Ekemark et al. | |
| 2017/0048756 A1* | 2/2017 | Sunell | H04W 36/0007 |
| 2017/0215065 A1* | 7/2017 | Vamanan | H04W 8/24 |
| 2019/0110190 A1* | 4/2019 | Van Lieshout | G06F 21/44 |

FOREIGN PATENT DOCUMENTS

| | | | | |
|---|---|---|---|---|
| WO | WO-2010092457 A1 | | 8/2010 | |
| WO | 2013059392 | | 4/2013 | |
| WO | WO-2013091665 A1 * | | 6/2013 | H04W 8/22 |
| WO | WO-2014163561 A1 | | 10/2014 | |

* cited by examiner

ENHANCED CAPABILITY EXCHANGE PROCEDURE FOR RADIO ACCESS TECHNOLOGY CHANGE

CROSS-REFERENCE TO RELATED APPLICATIONS

The present Application for Patent claims priority to U.S. Provisional Application No. 62/402,426, filed Sep. 30, 2016, which is assigned to the assignee of the present application and hereby expressly incorporated by reference herein in its entirety.

BACKGROUND

Field of the Disclosure

Aspects of the present disclosure relate generally to wireless communication systems, and more particularly, to enhanced user equipment (UE) capability exchange procedures for transitioning a connection from a wideband code division multiple access (WCDMA) system to a long term evolution (LTE) system.

Description of Related Art

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communications by a user equipment (UE) is provided. The method generally includes communicating with a first base station (BS) via a connection of a first radio access technology (RAT), determining, based on the first RAT, to omit a set of capabilities of the UE from capabilities information of the UE regarding a second RAT, transmitting the capabilities information of the UE regarding the second RAT to the first BS via the first RAT, communicating with a second BS via the second RAT according to the capabilities information, and sending an update of the capabilities information of the UE regarding the second RAT via the second RAT.

In an aspect of the disclosure, an apparatus for wireless communications is provided. The apparatus generally includes means for communicating with a first base station (BS) via a connection of a first radio access technology (RAT), means for determining, based on the first RAT, to omit a set of capabilities of the apparatus from capabilities information of the apparatus regarding a second RAT, means for transmitting the capabilities information of the apparatus regarding the second RAT to the first BS via the first RAT, means for communicating with a second BS via the second RAT according to the capabilities information, and means for sending an update of the capabilities information of the apparatus regarding the second RAT via the second RAT.

In an aspect of the disclosure, an apparatus for wireless communications is provided. The apparatus generally includes a processor configured to communicate with a first base station (BS) via a connection of a first radio access technology (RAT), to determine, based on the first RAT, to omit a set of capabilities of the apparatus from capabilities information of the apparatus regarding a second RAT, to transmit the capabilities information of the apparatus regarding the second RAT to the first BS via the first RAT, to communicate with a second BS via the second RAT according to the capabilities information, and to send an update of the capabilities information of the apparatus regarding the second RAT via the second RAT, and a memory coupled with the processor.

In an aspect of the disclosure, a computer-readable medium comprising instructions is provided. The instructions when executed by a processor cause the processor to perform operations generally including causing a user equipment (UE) to communicate with a first base station (BS) via a connection of a first radio access technology (RAT), determining, based on the first RAT, to omit a set of capabilities of the UE from capabilities information of the UE regarding a second RAT, cause the UE to transmit the capabilities information of the UE regarding the second RAT to the first BS via the first RAT, cause the UE to communicate with a second BS via the second RAT according to the capabilities information, and cause the UE to send an update of the capabilities information of the UE regarding the second RAT via the second RAT.

Numerous other aspects are provided including apparatus, systems and computer program products.

DETAILED DESCRIPTION

According to aspects of the present disclosure described in more detail below, a UE may communicate with a first BS via a connection of a first RAT and report capabilities information regarding a second RAT to the first BS via the first RAT. The UE may begin communicating with another BS via the second RAT according to the first set of capabilities and then update the capabilities information to include additional capabilities regarding the second RAT. By reporting a reduced set of capabilities via the first RAT, the UE may reduce signaling overhead and total time for a signaling procedure to complete as well as save power of the UE. In addition, reliability of a call may be improved due to reducing the signaling overhead and time required by the signaling procedure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
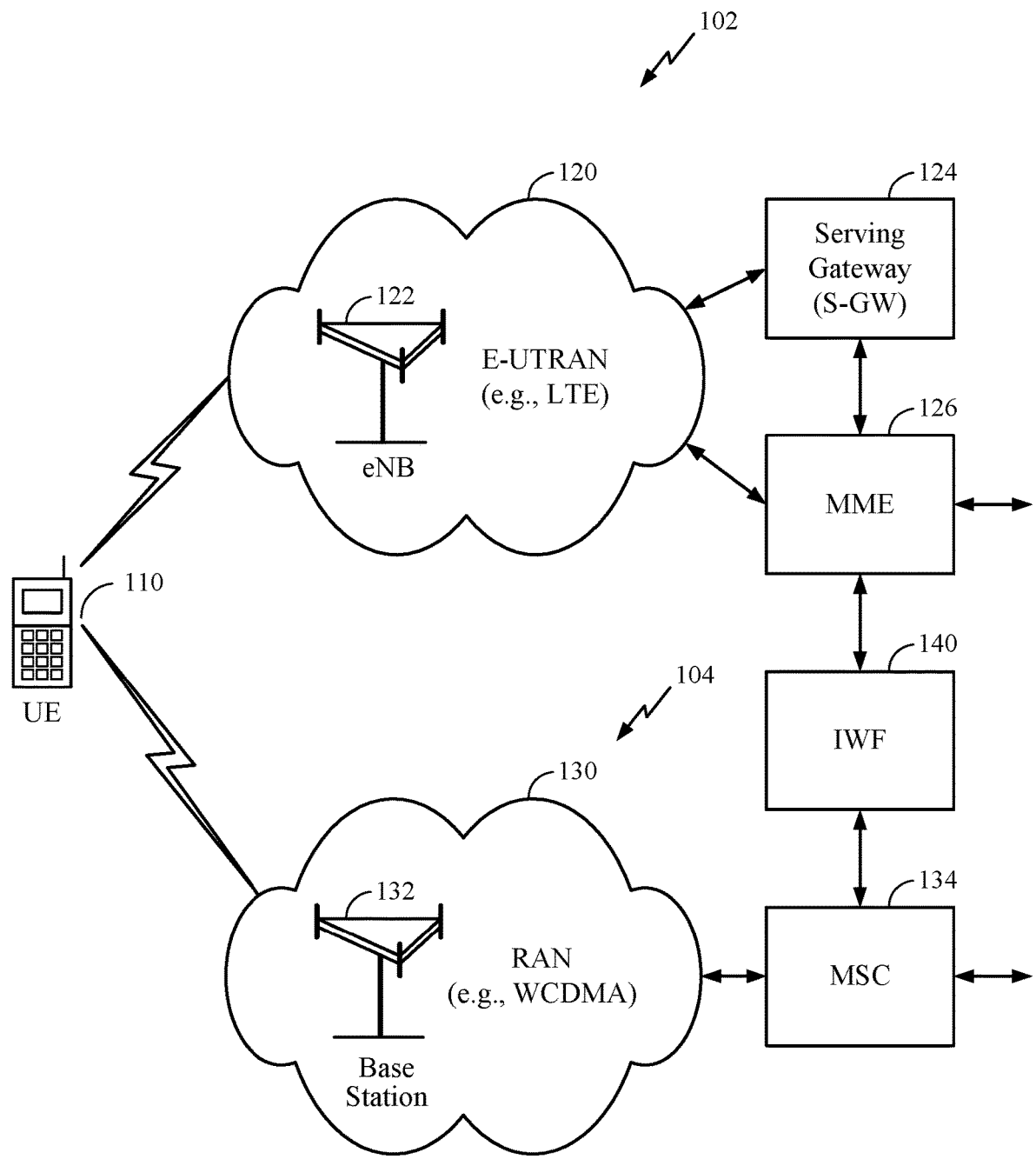
FIG. 1 illustrates an exemplary telecommunications system of multiple wireless radio access technologies (RATs), according to aspects of the present disclosure.

FIG. 1 shows an exemplary deployment in which multiple wireless networks have overlapping coverage. An evolved universal terrestrial radio access network (E-UTRAN) 120 may support LTE and may include a number of evolved Node Bs (eNBs) 122 and other network entities that can support wireless communication for user equipments 110 (UEs). Each eNB 122 may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1xCSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

Figure 2:
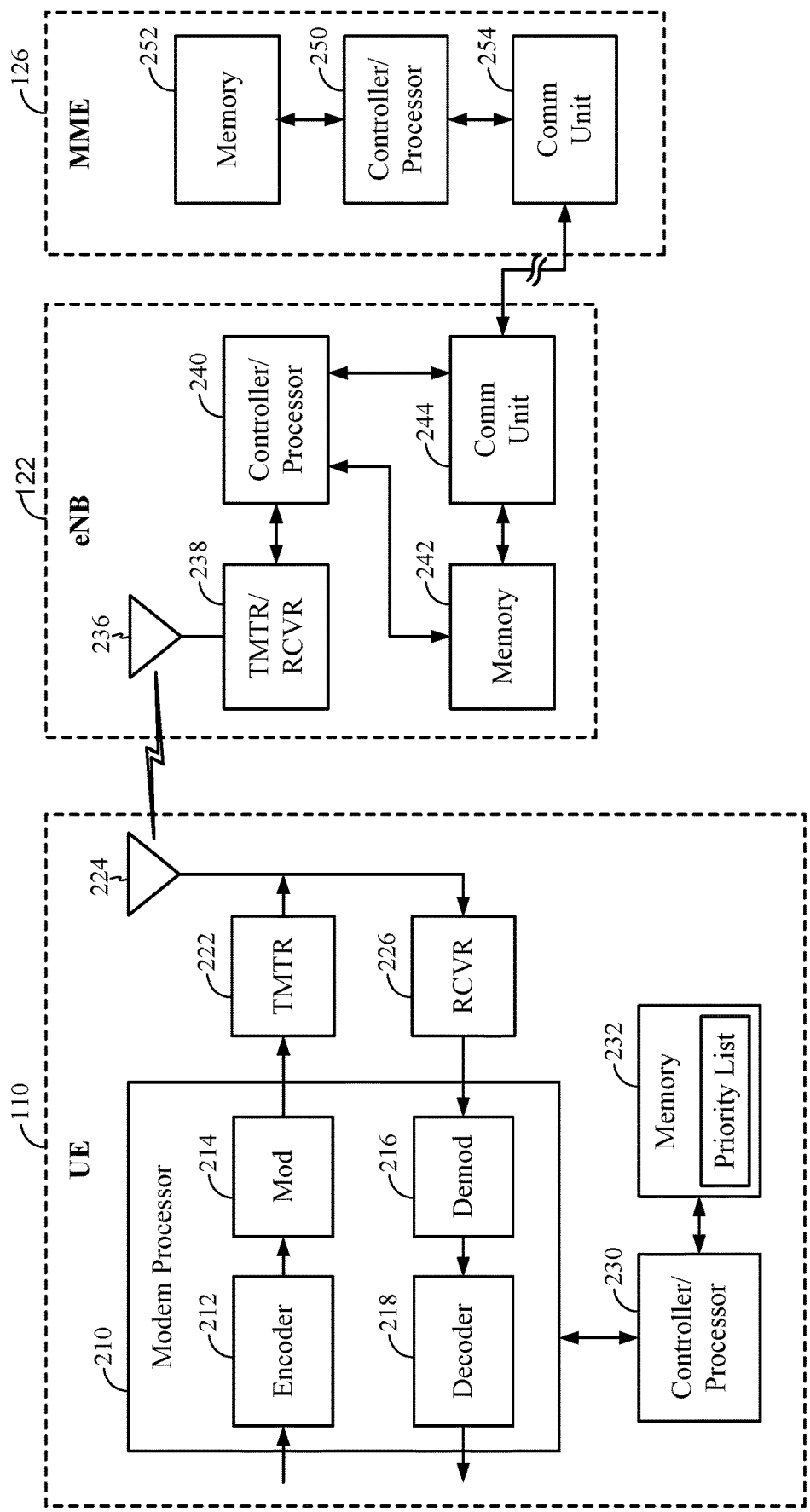
FIG. 2 conceptually illustrates examples of a user equipment (UE), evolved NodeB (eNB), and mobility management entity (MME) in communication, according to aspects of the present disclosure.

FIG. 2 shows a block diagram of a design of UE 110, eNB 122, and MME 126 in FIG. 1. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1xRTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE. Memory 232 may store program codes and data for UE 110. Memory 232 may also store a priority list and configuration information.

At eNB 122, a transmitter/receiver 238 may support radio communication with UE 110 and other UEs. A controller/ processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126 in FIGS. 3 and 4. Memory 252 may store program codes and data for MME 126. A communication unit 254 may support communication with other network entities.

FIG. 2 shows simplified designs of UE 110, eNB 122, and MME 126. In general, each entity may include any number of transmitters, receivers, processors, controllers, memories, communication units, etc. Other network entities may also be implemented in similar manner.

Figure 3:
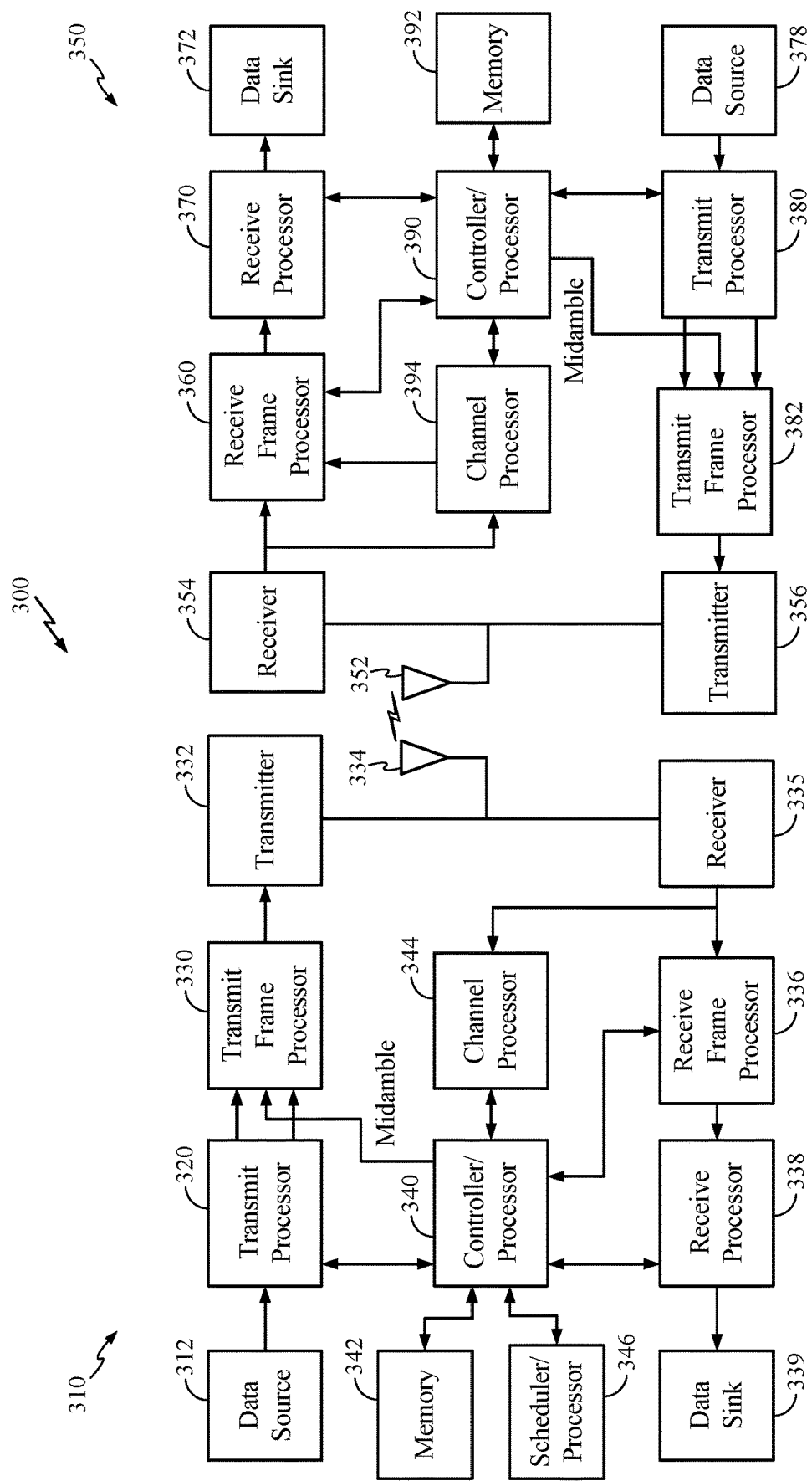
FIG. 3 is a block diagram conceptually illustrating an example of a Node B in communication with a user equipment (UE) in a telecommunications system, according to aspects of the present disclosure.

FIG. 3 is a block diagram of a Node B 310 in communication with a UE 350 in a RAN 300, wherein the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

According to one aspect of the present disclosure, controller/processor 390 of UE 350 may take measurements in a second RAN while on a voice call in a first RAN.

UEs (e.g., LTE-Advanced enabled UEs) may use spectrum of up to 20 MHz bandwidths for each component carrier. A plurality of component carriers may be allocated in a carrier aggregation configuration of up to a total of 100 MHz (5 component carriers) used for transmission and reception. For the LTE-Advanced enabled wireless communication systems, two types of carrier aggregation (CA) methods may be used, contiguous CA and non-contiguous CA, which are illustrated in FIGS. 4 and 5, respectively.

Figure 4:
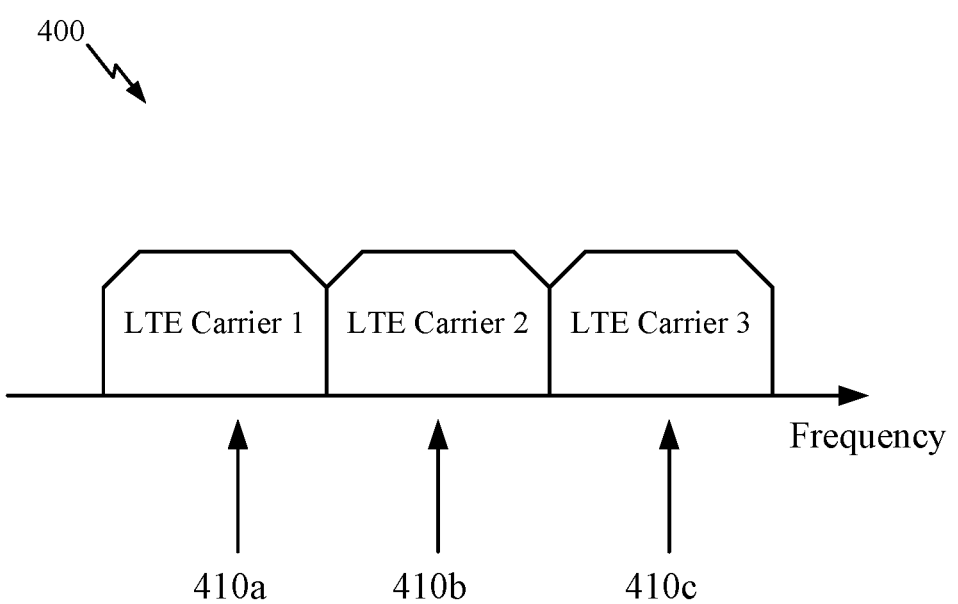
FIG. 4 illustrates contiguous carrier aggregation, in accordance with aspects of the present disclosure.

FIG. 4 illustrates contiguous CA 400, in which multiple available component carriers 410 adjacent to each other along the frequency band are aggregated. As illustrated, component carriers 410a, 410b, and 410c are adjacent to each other along the frequency band and aggregated together in a contiguous CA configuration. While three component carriers are illustrated, more or fewer component carriers may be aggregated in a contiguous CA configuration.

Figure 5:
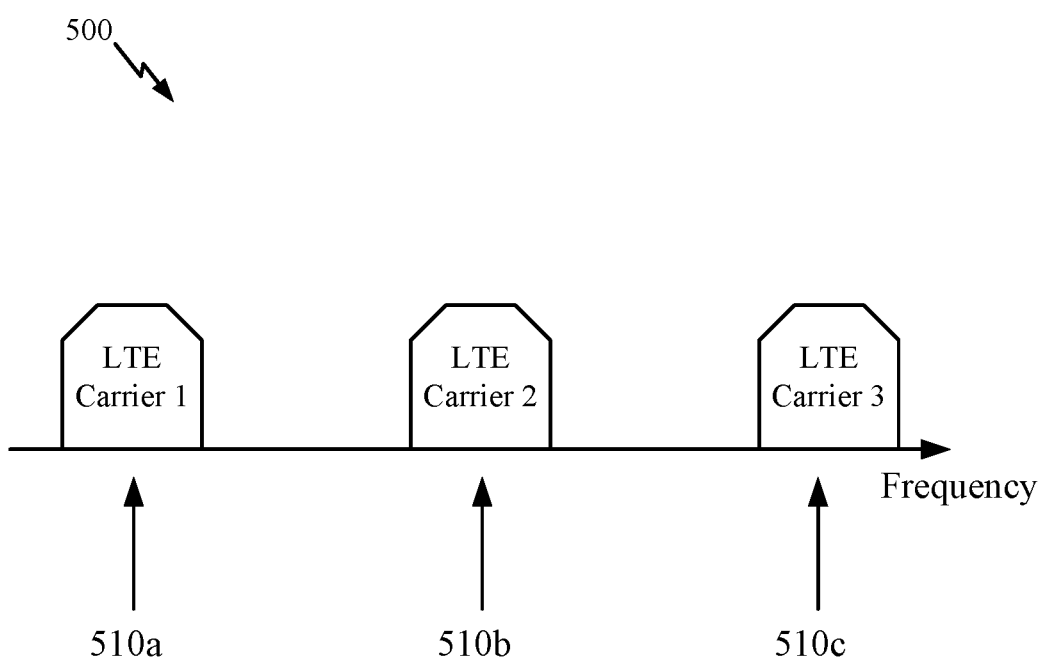
FIG. 5 illustrates non-contiguous carrier aggregation, in accordance with aspects of the present disclosure.

FIG. 5 illustrates non-contiguous CA 500, in which multiple available component carriers 510 separated along the frequency band are aggregated. As illustrated, component carriers 510a, 510b, and 610c are separated along the frequency band and aggregated together in a non-contiguous CA configuration. While three component carriers are illustrated, more or fewer component carriers may be aggregated in a non-contiguous CA configuration.

Both non-contiguous and contiguous CA may aggregate multiple component carriers to serve a single LTE-Advanced UE. In various examples, the UE operating in a multicarrier system (also referred to as carrier aggregation) is configured to aggregate certain functions of multiple carriers, such as control and feedback functions, on the same carrier, which may be referred to as a "primary component carrier" (PCC) or "primary carrier." The remaining carriers that depend on the primary carrier for support may be referred to as "secondary component carriers" (SCC) or "associated secondary carriers." For example, the control functions, such as those provided by the optional dedicated channel (DCH), the nonscheduled grants, a physical uplink control channel (PUCCH), and/or a physical downlink control channel (PDCCH) for multiple component carriers may be carried/transmitted on a PCC of a cell.

Example Enhanced Capability Exchange Procedure for Radio Access Technology Change As mentioned above and described in more detail below, according to aspects of the present disclosure, a UE may communicate with a first BS via a connection of a first RAT and report capabilities information regarding a second RAT to the first BS via the first RAT. The UE may begin communicating with another BS via the second RAT according to the first set of capabilities and then update the capabilities information to include additional capabilities regarding the second RAT. By reporting a reduced set of capabilities via the first RAT, the UE may reduce signaling overhead and total time for a signaling procedure to complete as well as save power of the UE. In addition, reliability of a call may be improved due to reducing the signaling overhead and time required by the signaling procedure.

In order to meet increasing demands for higher data rates, additional frequency bands are being allocated to wireless communications. In addition, newer devices (e.g., UEs) are capable of performing carrier aggregation, as described above, to enable higher data rates. Some new devices include world phone capability, enabling the devices to be used in almost any country because the devices support a large number of communications standards over a large number of frequency bands. When a device connects to a network, the device reports the various bandwidths and combinations (e.g., CA combinations) of bandwidths that the device can support in a capability information message. Due to the increases in the number of frequency bands supported by the newer devices and the increased number of CA capabilities, a capability information message transmitted by a newer device may be much larger than one reported by older devices.

The increased size of capability information messages from newer devices can negatively impact performance of the device in a wireless communications system. For example, the increased size of capability information messages may cause increases in serving radio bearer (SRB) signaling, which increases signaling overhead. The increased size also may increase total time for a signaling procedure to complete, which is undesirable for voice calls, especially emergency (e.g., 911) calls. In addition, repeated signaling of the capabilities messages (e.g., due to interference preventing a first transmission from being decoded, causing retransmission) may be challenging in marginal radio conditions (e.g., UE at cell-edge), increasing power drain from a UE, even though most of the capabilities information regarding the support of carrier aggregation by the UE may not be useful, because the marginal radio conditions prevent the UE from effectively using CA.

In some previously known techniques, new information elements (IEs) have been introduced to limit the frequency bands for which capability information is requested. Another previously known technique is to cause a UE to limit the frequency band capability information, based on proprietary public land mobile network (PLMN) based filters and/or operator based filters. Yet another previously known technique is to use a procedure to skip reporting some parts of the CA information in a capabilities information message. However, none of these previously known solutions has completely solved the problems from a commercial issues perspective, and many other proposals for solving the problems have been suggested.

Figure 6:
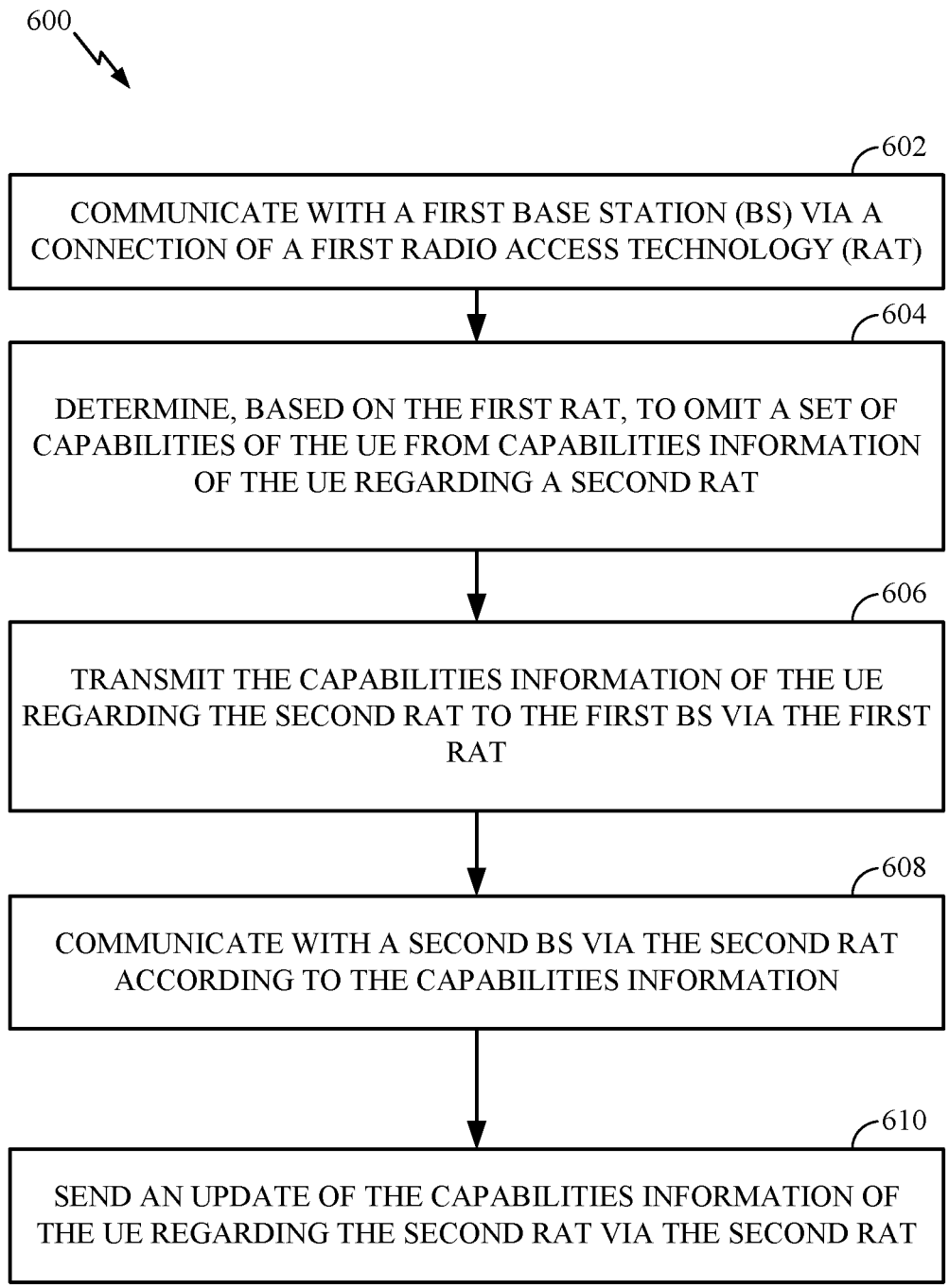
FIG. 6 illustrates exemplary operations for wireless communications that may be performed by a UE, in accordance with aspects of the present disclosure.

FIG. 6 illustrates exemplary operations 600 for wireless communications that may be performed by a UE, in accordance with aspects of the present disclosure. The operations 600 may be performed by a UE beginning a voice call in an area served by more than one type of radio access technology.

Operations 600 begin at block 602 with the UE communicating with a first base station (BS) via a connection of a first radio access technology (RAT). For example, the UE 110 shown in FIG. 1 may communicate with the base station 132 via a WCDMA connection.

At block 604, operations 600 continue with the UE determining, based on the first RAT, to omit a set of capabilities of the UE from capabilities information of the UE regarding a second RAT. In the example, the UE 110 determines, based on the RAT used for communicating with the base station 132 being a WCDMA RAT, to omit carrier aggregation capabilities of the UE from capabilities information of the UE regarding LTE. That is, in the example, the set of capabilities of the UE that are omitted are carrier aggregation capabilities, and the second RAT is LTE.

Operations 600 continue at block 606 with the UE transmitting the capabilities information of the UE regarding the second RAT to the first BS via the first RAT. Continuing the example, the UE 110 transmits capabilities information of the UE in an LTE system, omitting CA capabilities of the UE that the UE determined to omit in block 604, to the BS 132 via the WCDMA connection.

Operations 600 continue at block 608 with the UE communicating with a second BS via the second RAT according to the capabilities information. Continuing the example, the UE 110 communicates with the eNB 122 via LTE according to the capabilities information that the UE transmitted to the BS 132 in block 604, which may have been conveyed to the eNB by the BS. That is, the UE 110 communicates with (e.g., hands over to) the eNB 122 without using any carrier aggregation capabilities (e.g., on a single carrier frequency of the LTE network).

Operations 600 continue at block 610 with the UE sending an update of the capabilities information of the UE regarding the second RAT via the second RAT. Continuing the example, the UE 110 may transmit a "radio capabilities update needed" information element to the eNB to cause the eNB to request the radio capabilities update from the UE, and, after the eNB has requested the radio capabilities update, the UE transmits capabilities information of the UE in the LTE system to the eNB 122, including the previously omitted CA capabilities, which the UE determined to omit in block 604, of the UE.

According to aspects of the present disclosure, when a network entity (e.g., a BS) requests capabilities of a UE in preparation for handing over the UE to an LTE domain, the UE reports all LTE capabilities of the UE without any carrier aggregation IEs (i.e., omitting the CA IEs) when the UE is connected via a WCDMA domain. By obtaining this subset of the UE capabilities, the network (e.g., an MSC, an MME) has information about some of the UE capabilities in LTE. Because LTE data rates are always higher than WCDMA rates, even without CA, the network will make the same decision to move (e.g., transition or hand over) the UE to the LTE domain in order to supply a better (e.g. higher) data rate to the UE, whether or not the network has information regarding CA capabilities of the UE.

According to aspects of the present disclosure, while moving to an LTE domain, a UE will report a "radio capability update needed" IE in a tracking area update (TAU) procedure that occurs as part of the move to the LTE domain. Upon receiving this "radio capability update needed" IE, the network (e.g., an MME, an eNB) will request the UE capabilities from the UE. Because the UE has transitioned to the LTE domain and is no longer connected via WCDMA, the UE determines to report all of the UE capabilities information, including carrier aggregation information.

With the above described UE algorithm, the network obtains full capability information of the UE while transitioning the UE to the LTE domain and can assign more transmission resources (e.g., by using CA) to the UE to provide enhanced data rates to the UE.

According to aspects of the present disclosure, this is a UE-only (e.g., no changes to BSs or other network entities are required) solution and does not require changes to network specifications. This technique may improve call sustainability by allowing improvements in a size (e.g., a reduction in the size) of an overall capability message sent from a UE.

According to aspects of the present disclosure, a UE may determine to omit a set of capabilities of the UE from capabilities information transmitted to a BS. The omitted set of capabilities may include one or more capabilities of the UE to communicate using CA.

According to aspects of the present disclosure, a UE may update capabilities information provided to a network entity (e.g., a BS, an MME) by transmitting capabilities information previously omitted when the UE previously reported capabilities information to a network entity.

According to aspects of the present disclosure, a UE may determine to omit a set of capabilities when reporting capabilities information to a network entity based on a radio access technology of a current connection of the UE to the network entity. For example, a UE may be connected to a network via a WCDMA radio access technology. In the example, the network may request capabilities information from the UE. Still in the example, the UE may be multi-RAT capable and may be capable of aggregating several (e.g., five) carrier frequencies in an LTE RAT network. In the example, the UE may determine, based on the connection to the network being via a WCDMA RAT, to omit the carrier aggregation capabilities of the UE from capabilities information that the UE reports to the network.

According to aspects of the present disclosure, a UE may determine to omit a set of capabilities when reporting capabilities information to a network entity based on a radio access technology to which a connection of the UE to the network is being transitioned. That is, a UE may determine to omit some capabilities information based on what type of RAT the connection of the UE is being moved to.

According to aspects of the present disclosure, a UE may transmit a request to update capabilities information to a BS after a connection of the UE has been transitioned to the RAT of the BS. The UE may receive a response from the BS approving the UE updating the capabilities information, and the UE may then update the capabilities information. For example, while moving to an LTE domain, a UE may request to update capabilities information of the UE by reporting a "radio capability update needed" IE in a tracking area update (TAU) procedure that occurs as part of the move to the LTE domain. In the example, upon receiving this "radio capability update needed" IE, the network (e.g., an MME, an eNB) may approve the UE updating the capabilities information by requesting the UE capabilities from the UE. The UE may then update the UE capabilities information by transmitting capabilities information to the BS.

As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for wireless communications by a user equipment (UE), comprising:
    communicating with a first base station (BS) via a connection of a first radio access technology (RAT);
    determining, based on determining that the first RAT comprises a legacy RAT and that the UE is to be transitioned to operating on a second RAT comprising a non-legacy RAT, to omit information about a capability of the UE to support carrier aggregation in operations using the second RAT from capabilities information of the UE regarding the second RAT;
    obtaining an indication from the first BS to transition the connection to the second RAT;
    transmitting the capabilities information of the UE regarding the second RAT, excepting the omitted information about the capability of the UE to support carrier aggregation in operations using the second RAT, to the first BS via the first RAT, wherein the transmitting the capabilities information is in response to obtaining the indication;
    communicating with a second BS via the second RAT using a single carrier according to the capabilities information;
    sending an update of the capabilities information of the UE regarding the second RAT via the second RAT, the update including at least the information about a capability of the UE to support carrier aggregation in operations using the second RAT; and
    based on sending the update, communicating with the second BS via the second RAT using carrier aggregation over a plurality of carriers.

2. The method of claim 1, wherein sending the update of the capabilities information comprises transmitting the omitted information about a capability of the UE to support carrier aggregation in operations using the second RAT to the second BS.

3. The method of claim 1, wherein determining to omit the information about a capability of the UE to support carrier aggregation in operations using the second RAT is further based on the second RAT.

4. The method of claim 1, further comprising:
transmitting, prior to sending the update, a request to update the capabilities information to the second BS via the second RAT; and
receiving, in response to the request and prior to sending the update, approval to update the capabilities information from the second BS.

5. The method of claim 4, wherein the request to update the capabilities information comprises a radio capability update needed information element (IE) included in a tracking area update (TAU) message.

6. An apparatus for wireless communications, comprising:
means for communicating with a first base station (BS) via a connection of a first radio access technology (RAT);
means for determining, based on determining that the first RAT comprises a legacy RAT and that the UE is to be transitioned to operating on a second RAT comprising a non-legacy RAT, to omit information about a capability of the UE to support carrier aggregation in operations using the second RAT from capabilities information of the UE regarding the second RAT;
means for obtaining an indication from the first BS to transition the connection to the second RAT;
means for transmitting the capabilities information of the UE regarding the second RAT, excepting the omitted information about the capability of the UE to support carrier aggregation in operations using the second RAT, to the first BS via the first RAT, wherein the transmitting the capabilities information is in response to obtaining the indication
means for communicating with a second BS via the second RAT using a single carrier according to the capabilities information;
means for sending an update of the capabilities information of the UE regarding the second RAT via the second RAT, the update including at least the information about a capability of the UE to support carrier aggregation in operations using the second RAT; and
means for communicating, based on sending the update, with the second BS via the second RAT using carrier aggregation over a plurality of carriers.

7. The apparatus of claim 6, wherein the means for sending the update of the capabilities information comprises means for transmitting the omitted information about a capability of the UE to support carrier aggregation in operations using the second RAT to the second BS.

8. The apparatus of claim 6, wherein the means for determining to omit the set of capabilities comprises means for determining to omit the information about a capability of the UE to support carrier aggregation in operations using the second RAT based on the second RAT.

9. The apparatus of claim 6, further comprising:
means for transmitting, prior to sending the update, a request to update the capabilities information to the second BS via the second RAT; and
means for receiving, in response to the request and prior to sending the update, approval to update the capabilities information from the second BS.

10. The apparatus of claim 9, wherein the request to update the capabilities information comprises a radio capability update needed information element (IE) included in a tracking area update (TAU) message.

11. An apparatus for wireless communications, comprising:
a processor configured to:
communicate with a first base station (BS) via a connection of a first radio access technology (RAT);
determine, based on determining that the first RAT comprises a legacy RAT and that the UE is to be transitioned to operating on a second RAT comprising a non-legacy RAT, to omit information about a capability of the UE to support carrier aggregation in operations using the second RAT from capabilities information of the UE regarding the second RAT;
obtain an indication from the first BS to transition the connection to the second RAT
transmit the capabilities information of the UE regarding the second RAT, excepting the omitted information about the capability of the UE to support carrier aggregation in operations using the second RAT, to the first BS via the first RAT, wherein the capabilities information is transmitted in response to obtaining the indication;
communicate with a second BS via the second RAT using a single carrier according to the capabilities information;
send an update of the capabilities information of the UE regarding the second RAT via the second RAT, the update including at least the information about a capability of the UE to support carrier aggregation in operations using the second RAT; and
based on sending the update, communicate with the second BS via the second RAT using carrier aggregation over a plurality of carriers; and
a memory coupled with the processor.

12. The apparatus of claim 11, wherein the processor is configured to send the update of the capabilities information by transmitting the omitted information about a capability of the UE to support carrier aggregation in operations using the second RAT to the second BS.

13. The apparatus of claim 11, wherein the processor is configured to determine to omit the information about a capability of the UE to support carrier aggregation in operations using the second RAT further based on the second RAT.

14. The apparatus of claim 11, wherein the processor is further configured to:
transmit, prior to sending the update, a request to update the capabilities information to the second BS via the second RAT; and
receive, in response to the request and prior to sending the update, approval to update the capabilities information from the second BS.

15. The apparatus of claim 14, wherein the processor is configured to transmit the request to update the capabilities information by transmitting a radio capability update needed information element (IE) included in a tracking area update (TAU) message.

16. A non-transitory computer-readable medium comprising instructions, the instructions when executed by a processor cause the processor to perform operations comprising:
causing a user equipment (UE) to communicate with a first base station (BS) via a connection of a first radio access technology (RAT);
causing the UE to determine, based on determining that the first RAT comprises a legacy RAT and that the UE is to be transitioned to operating on a second RAT comprising a non-legacy RAT, to omit information about a capability a set of capabilities of the UE to support carrier aggregation in operations using the second RAT from capabilities information of the UE regarding the second RAT;

causing the UE to obtain an indication from the first BS to transition the connection to the second RAT;

causing the UE to transmit the capabilities information of the UE regarding the second RAT, excepting the omitted information about the capability of the UE to support carrier aggregation in operations using the second RAT, to the first BS via the first RAT, wherein the capabilities information is transmitted in response to obtaining the indication;

causing the UE to communicate with a second BS via the second RAT using a single carrier according to the capabilities information;

causing the UE to send an update of the capabilities information of the UE regarding the second RAT via the second RAT, the update including at least the information about a capability of the UE to support carrier aggregation in operations using the second RAT; and causing the UE to communicate, based on sending the update, with the second BS via the second RAT using carrier aggregation over a plurality of carriers.

17. The computer-readable medium of claim 16, wherein the instructions to cause to UE to send the update of the capabilities information comprises instructions to cause the UE to transmit the omitted information about a capability of the UE to support carrier aggregation in operations using the second RAT to the second BS.

18. The computer-readable medium of claim 16, wherein the instructions to determine to omit the information about a capability of the UE to support carrier aggregation in operations using the second RAT comprises instructions to determine to omit the set of capabilities based on the second RAT.

19. The computer-readable medium of claim 16, wherein the operations further comprise:
   causing the UE to transmit, prior to sending the update, a request to update the capabilities information to the second BS via the second RAT; and
   causing the UE to receive, in response to the request and prior to sending the update, approval to update the capabilities information from the second BS.

20. The computer-readable medium of claim 19, wherein the instructions to cause the UE to transmit the request to update the capabilities information comprises instructions to cause the UE to transmit a radio capability update needed information element (IE) included in a tracking area update (TAU) message.

* * * * *